United States Patent [19]

Li et al.

[11] Patent Number: 5,560,806
[45] Date of Patent: Oct. 1, 1996

[54] PROCESS FOR DEINKING ELECTROSTATIC PRINTED PAPER USING A COMBINATION OF NON-IONIC SURFACTANTS

[75] Inventors: Chin Li, Murrysville; Kevin Hipolit, Carnegie; Bhima R. Vijayendran, Monroeville, all of Pa.

[73] Assignee: PPG Industries, Inc., Pittsburgh, Pa.

[21] Appl. No.: 231,553

[22] Filed: Apr. 22, 1994

[51] Int. Cl.$^6$ ................................................. D21C 5/02
[52] U.S. Cl. ........................................... 162/5; 162/4
[58] Field of Search ............................ 162/5, 4; 252/61, 252/174.22, 358, DIG. 1, 162

[56] References Cited

U.S. PATENT DOCUMENTS

| | | | |
|---|---|---|---|
| 3,061,552 | 10/1962 | Schenck et al. | 252/135 |
| 4,276,118 | 6/1981 | Quick | 162/5 |
| 4,518,459 | 5/1985 | Freis et al. | 162/5 |
| 4,561,933 | 12/1985 | Wood et al. | 162/5 |
| 4,820,379 | 4/1989 | Darlington | 162/5 |
| 5,102,500 | 4/1992 | Darlington | 162/5 |
| 5,141,598 | 8/1992 | Richman | 162/5 |
| 5,200,034 | 4/1993 | Richmann et al. | 162/5 |
| 5,217,573 | 6/1993 | Tsai et al. | 162/5 |
| 5,248,388 | 9/1993 | Richmann et al. | 162/5 |
| 5,259,969 | 11/1993 | Svrivatsa et al. | 252/60 |

FOREIGN PATENT DOCUMENTS

| | | | |
|---|---|---|---|
| 729070 | 3/1966 | Canada | 162/5 |
| 51-84905 | 7/1976 | Japan | 162/5 |
| 0031804 | 3/1978 | Japan | 162/5 |
| 0051891 | 4/1980 | Japan | 162/5 |
| 0223391 | 12/1984 | Japan | 162/5 |

*Primary Examiner*—Donald E. Czaja
*Assistant Examiner*—Dean T. Nguyen
*Attorney, Agent, or Firm*—Frank P. Mallak; Irwin M. Stein

[57] ABSTRACT

Describes a method for deinking wastepaper printed with electrostatic ink or mixtures thereof with wastepaper printed with impact ink in which a combination of nonionic surfactants are added to an alkaline slurry of the paper fibers. The surfactants are a first nonionic surfactant represented by the formula,

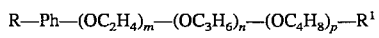

$$R-Ph-(OC_2H_4)_m-(OC_3H_6)_n-(OC_4H_8)_p-R^1$$

and a second nonionic surfactant represented by $R^2-(OC_2H_4)_r-OH$, $R^3-(OC_2H_4)_s-R^4$ or mixtures of such second nonionic surfactants. R contains 8 to 10 carbon atoms, Ph is phenylene, $R^1$ is chloro or phenoxy, $R^2$ contains 10 to 16 carbon atoms, $R^3$ contains 8 to 14 carbon atoms, $R^4$ is chloro, the sum of m, n and p is a number of from 1 to 10, r is a number of from 1 to 5 and s is a number of from 0.5 to 15. The ratio of the first to second nonionic surfactants is from 1:100 to 1:1.

14 Claims, No Drawings

PROCESS FOR DEINKING ELECTROSTATIC PRINTED PAPER USING A COMBINATION OF NON-IONIC SURFACTANTS

DESCRIPTION OF THE INVENTION

This invention relates to a novel deinking agent and process for removing ink, toner, or the like from printed wastepaper in the course of recycling the fiber content of the wastepaper for reuse in the manufacture of new paper. More particularly, the invention relates to a novel deinking agent and process for deinking wastepaper printed with electrostatic toners used in laser and xerographic printing processes. Still more particularly, the invention relates to a novel deinking agent and process for deinking electrostatically printed wastepaper mixed with wastepaper printed with conventional impact inks.

Recycled wastepaper has traditionally been a source of raw fiber material needed in the paper making industry. In the past, fiber from wastepaper was only employed in the production of low grade paper and paperboard products. Today, however, it is reported that reclaimed fiber comprises about 25 percent of the total fiber used to manufacture paper thereby providing an incentive for improving the quality of reclaimed paper pulp materials. In particular, recent efforts have been directed to develop techniques for effectively removing ink from waste fibers, in order to permit their use in the manufacture of high quality paper.

Conventional paper reclamation procedures include steps for converting the wastepaper to pulp and contacting the pulp with an alkaline aqueous deinking medium containing a deinking chemical. The physical pulping in an alkaline aqueous deinking medium causes the removal of ink and other impurities from the pulp fiber and produces a suspension and/or dispersion of the ink and other particles in the aqueous medium. The resulting mixture is subsequently treated to separate the suspended ink and other particles from the pulp by, for example, air sparging and flotation of the ink/deinking chemical complex followed by skimming to remove the ink and other particles from the treatment bath, filtration and subsequent water washing of the fiber mat to remove dispersed ink particles, or a combination of these treatments.

A variety of materials, particularly surfactants and mixtures of surfactants are known to be useful as deinking chemicals in such processes applied to the deinking of common wastepaper stock, i.e., newsprint, book, magazine, and ledger printed with conventional impact inks. Conventional impact inks are primarily water or oil based inks used in impact printing processes such as in offset printing or other mechanical printing processes. It is recognized, however, that conventional deinking processes have not been particularly successful in specific application to electrostatically printed wastepaper and common wastepaper stock containing the same. The difficulty encountered in the deinking of electrostatically printed wastepaper has been attributed to the character of electrostatic toner, specifically the binder, which is fundamentally different from that used in other printing processes. For example, in contrast to the common oil or resin binder of conventional impact inks, the electrostatic ink binder is typically a polymeric material such as a polyester, styrene-butadiene copolymer or styrene-acrylic copolymer, which during the printing process is fixed to the paper by the application of heat.

Since business offices use a variety of printers, the wastepaper received at the recycling mill often contains papers printed with different types of inks. The ink from electrostatically printed papers will contaminate recycled fibers obtained from paper which was printed with conventional impact ink when conventional deinking processes are used. Electrostatic toner particles removed from the repulped fibers during the conventional deinking process are usually flat flakes and small ink particles. Paper prepared from such recycled fibers will have a high number of visible specks or dirt, i.e., ink particles having a surface area ranging from about 0.002 millimeters square to about 0.07 millimeters square. This ink particle surface area range includes TAPPI dirt defined as particles having a surface area greater than 0.04 millimeters square and Fine dirt defined as particles having a surface area less than 0.04 millimeters square. Such paper would be unsatisfactory for use except for the manufacture of low grade paper materials, e.g., low grade packaging cartons, tissue, and towels. Therefore, papers printed with electrostatic toners are not only difficult to recycle, but their presence in common wastepaper stock will reduce the quality and value of contaminated fiber produced by conventional deinking processes, as well.

Various processes have been disclosed for the removal of ink or toner from electrostatically or xerographically printed wastepaper. The use of a dual system of a toner collector and collecting chemical is described in U.S. Pat. No. 4,276,118; a process incorporating a deinking chemical used in combination with a nonionic surfactant is described in U.S. Pat. No. 4,561,933; a composition comprising a combination of (a) aliphatic petroleum distillates, (b) alkyl-phenoxypoly-(ethyleneoxy) ethanol and (c) and ethoxylated polyoxypropylene glycol is described in U.S. Pat. No. 5,141,598; a surfactant having a hydrophile/lipophile balance from about 0.5 to 10 is described in U.S. Pat. No. 5,200,034; and a surfactant having the formula $R_1$—$R_2$—$R_3$, wherein $R_1$ and $R_3$ are each selected from the group consisting of rosin, rosin dimers, and mixtures of rosin and rosin dimers, and $R_2$ is a polyethylene glycol is described in U.S. Pat. No. 5,217,573.

The removal of ink or toner from electrostatically or xerographically printed wastepaper treated alone or in combination with non-electrostatically printed or conventional impact ink printed wastepaper has also been disclosed. A method utilizing a polymeric material having a glass transition temperature in the range of from about 20° C. to about 70° C. and a substituted polyethylene oxide compound is described in U.S. Pat. No. 4,820,379; and the use of a mixture of one or more solvents, a nonionic surfactant, an anionic surfactant and water is described in U.S. Pat. No. 5,259,969.

Although improvements in the deinking of electrostatically or xerographically printed wastepaper treated alone or in combination with non-electrostatically printed or conventional impact ink printed wastepaper have been achieved via the use of deinking chemicals with or without the use of collectors, as described in the prior art, further improvements in the reduction of dirt counts are desirable and have been pursued.

It has now been discovered that the deinking of electrostatically or xerographically printed wastepaper treated alone or in combination with non-electrostatically printed or conventional impact ink printed wastepaper by the novel process of the present invention results in a pulp having a lower Fine dirt count than if treated by the individual components of the novel deinking agent used in the process of the invention or by the commercial product BETZ® CDI B279. Reduction of the Fine dirt count is achieved by agglomerating the flat flakes and small ink particles into relatively larger particles which can be removed by physical processes, e.g., centrifugation or screening, in conjunction with washing, flotation, or a combination of these processes.

The process of the present invention comprises the steps of:

(a) repulping electrostatically printed paper alone or in combination with non-electrostatically printed paper into a slurry of paper fibers in an alkaline aqueous medium with or without a suitable collector, (b) adding to the slurry with agitation a deinking amount of the novel deinking agent of the present invention which comprises a synergistic combination of nonionic surfactant material heretofore undisclosed for deinking, and other deinking nonionic surfactant material(s) with or without the further addition of nonpolar solvent(s), (c) continuing agitation of the slurry for between about 5 and 60 minutes while maintaining its temperature of from about 120° F. (48.9° C.) to about 175° (79.4° C.), and (d) separating the agglomerated electrostatic (or the combination of the electrostatic and nonelectrostatic) ink particles from the aqueous paper fiber slurry.

DETAILED DESCRIPTION OF THE INVENTION

The first deinking nonionic surfactant material may be represented by formula I:

$$R-Ph-(OC_2H_4)_m-(OC_3H_6)_n-(OC_4H_8)_p-R^1 \qquad I$$

In formula I, R may be an aliphatic hydrocarbon group, preferably containing from about 5 to 20 carbon atoms, and more preferably, containing from about 8 to 10 carbon atoms, Ph represents the bivalent phenylene group, $-(OC_2H_4)_m-$ represents a poly(ethylene oxide) chain, $-(OC_3H_6)_n-$ represents a poly(propylene oxide) chain, and $-(OC_4H_8)_p-$ represents a poly(butylene oxide) chain. The order of the poly(ethylene oxide), poly(propylene oxide), and poly(butylene oxide) chains may be ordered or may be random, i.e., the poly(ethylene oxide) chain, the poly(propylene oxide) chain, and the poly(butylene oxide) chains may be in a random order in the molecule. $R^1$ in formula I is selected from the group consisting of chloro, $C_1-C_5$ alkoxy, phenoxy, and phenyl $(C_1-C_3)$ alkoxy, and preferably, is chloro. The letters m, n, and p are each a number of between 0 and about 50, with the proviso that n is less than 11 and the sum of m, n, and p is between about 1 and 50; more preferably, m, n, and p are each a number of between 0 and about 30, with the proviso that the sum of m, n, and p is between about 1 and 30; most preferably, m, n, and p are each a number of between 0 and about 10, with the proviso that the sum of m, n, and p is between about 1 and 10.

Procedures for the preparation of compounds of formula I having poly(ethylene oxide) and poly(propylene oxide) chains with a benzyl group as $R^1$ are disclosed in U.S. Pat. No. 4,518,459, column 5 line 49 to column 8 line 25. The incorporation of a poly(butylene oxide) chain could be accomplished by similar methods or other methods known in the art. The preparation of compounds having $C_1-C_3$ alkyl, $C_1-C_5$ alkoxy, phenoxy, and phenyl $(C_1-C_3)$alkoxy, as $R^1$ may be accomplished by use of the Williamson Synthesis described in *The Merck Index,* Tenth edition, published by Merck & Co., Inc., 1983, page ONR-96. The preparation of compounds having a chloro group as $R^1$ is described in *Surface Active Agents* by A. M. Schwarz and J. W. Perry, Interscience Publishers, Inc., 1949, page 109. The above reference and U.S. Pat. No. '459 are herein incorporated by reference.

The second deinking nonionic surfactant material of the present invention may be selected from other nonionic surfactants that are known in the art for use in deinking processes. Specific mention may be made of the nonionic surfactants recognized for their utility in related deinking processes, particularly those described in the aforementioned U.S. Pat. Nos. 4,561,933; 4,820,379; 5,141,598; and 5,200,034, the teaching of which relative to suitable and preferred classes of nonionic surfactants are incorporated herein by reference. Suitable and preferred classes of second nonionic surfactants are those that when combined with the first nonionic surfactant material of formula I produce a synergistic effect in the deinking process, i.e., the agglomeration and removal of ink particles by the combination of the second deinking nonionic surfactant material with the surfactants of formula I is greater than the reduction effected by the individual components in the deinking process of the present invention.

More particularly, the second deinking nonionic surfactant material may be selected from the group consisting of ethoxylates of primary, secondary and other branched paraffinic alcohols containing from about 6 to 20 carbon atoms and having an average number of poly(ethylene oxide) or ethoxy groups of from 1 to 10; alkyl phenol ethoxylates and dialkyl phenol ethoxylates wherein each of the alkyl substituents contain from about 6 to about 12 carbon atoms and the average number of ethoxy groups range from about 1 to 9; glycerol esters of fatty acids containing from 6 to 24 carbon atoms; ethoxylates, propoxylates and mixed $C_2-C_4$ alkoxylates of fatty acids wherein the fatty acids contain from 6 to 24 carbon atoms and the average number of alkoxy groups range from about 1 to 10; sorbitan fatty acid esters wherein the fatty acids contain 6 to 24 carbon atoms; fatty acid alkanolamides, such as fatty acid diethanolamides wherein the fatty acid contains from 6 to 24 carbon atoms and the alkanolamide contains from 1 to 4 carbon atoms; amine ethoxylates such as tertiary amine ethoxylates, e.g., RN(R')R" wherein R is a group containing from about 6 to 24 carbon atoms, such as the residue of a fatty acid, and R' and R" are each ethoxy or polyethoxy groups having an average 1 to 6 ethoxy groups; blocked copolymers of ethylene oxide and propylene oxide, e.g., ethoxylated polyoxypropylene glycols and propoxylated polyoxyethylene glycols each having an average of 1 to 45 ethoxy groups and 14 to 77 propoxy groups; and capped nonionics, e.g., $R(OC_2H_4)_nR'$, wherein R is $C_6$ to C20 linear or branched alkyl, R' is selected from halogen, e.g., chloro, benzyl, phenoxy, $C_1-C_4$ alkoxy or $-O(C_mH_{2m}O)_pH$ wherein m is 3 or 4 and p is 1 to 5, n denotes the average number of ethylene oxide units as a whole or fractional number ranging from 3 to 20 and mixtures of such materials.

Most particularly, the second deinking nonionic surfactant material of the present invention is selected from the group consisting of materials represented by formulae II, III, or IV, block copolymers of ethylene oxide and propylene oxide; or mixtures of such materials.

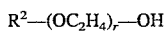

$$R^2-(OC_2H_4)_r-OH \qquad II$$

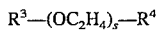

$$R^3-(OC_2H_4)_s-R^4 \qquad III$$

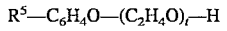

$$R^5-C_6H_4O-(C_2H_4O)_t-H \qquad IV$$

In formula II, $R^2$ may be a linear or branched aliphatic hydrocarbon group that preferably contains from about 5 to about 20 carbon atoms. More preferably, $R^2$ is a branched aliphatic hydrocarbon group containing from about 10 to about 16 carbon atoms. Preferably, r is a number of between about 1 and about 10, and more preferably, a number of between about 1 and 5. Compounds of formula II are typically described as ethoxylated alcohols and include commercially available products such as NEODOL® 23-1, 25-3, 45-2.5, and 91- 2.5; TERGITOL® 15-S-3; and ICONOL® TDA-3.

In formula III, $R^3$ may be a linear or branched aliphatic hydrocarbon group containing from about 5 to about 20 carbon atoms. More preferably, $R^3$ is a branched aliphatic hydrocarbon group containing from about 8 to about 14 carbon atoms. Preferably, $R^4$ is chloro and s is a number of between about 0 5 and about 15. More preferably s is a number of between about 5 and about 10. Preparation of the compounds of formula III is described in U.S. Pat. No. 4,820,379, column 2 line 26 to line 37. A commercially available product of formula III is the chloro capped aliphatic polyether, available as ANTAROX® LF-330.

In formula IV, $R^5$ may be a $C_8$—$C_{13}$ alkyl, e.g., a member selected from the group consisting of octyl, nonyl, decyl, dodecyl, and tridecyl and t is a number of between about 1 and about 9. Compounds of formula IV are typically described as ethoxylated alkyl phenols and include commercially available products such as IGEPAL® DM-430, CA-210, CA-420, CO-210, CO-420, and RC-520; TERGITOL® N-4 and N- 5; and TRITON® N-42, N-57, X-15 and X-35.

The nonionic surfactant block copolymers of ethylene oxide and propylene oxide may be selected from the group consisting of ethoxylated polyoxypropylene glycols and propoxylated polyoxyethylene glycols each having an average of 1 to 45 poly(ethylene oxide) units and 14 to 77 poly(propylene oxide)units. Commercially available products include the PLURONIC® L series of surfactants.

The deinking agent of the present invention comprises a synergistic mixture of (a) a first nonionic surfactant material represented by formula I and (b) a second deinking nonionic surfactant material as defined herein that cause the agglomeration of ink particles. The effective ratio of (a) to (b) preferably ranges from about 1:100 to about 1:1 and more preferably ranges from about 1:50 to about 1:2, and most preferably ranges from about 1:30 to about 1:3, the total amount of the components being equal to 100 percent of the deinking agent.

The deinking agent of the present invention may also contain a nonpolar solvent (c), preferably having a flash point, determined by the most appropriate procedure described in ASTM Methods D 56, D 93, or D 3278, of greater than 125° F. (51.7° C.), and more preferably greater than 140° F. (60° C.). Suitable solvents include mineral spirits available as SHELL® Sol 140 HT; de-aromatized aliphatics available as EXXSOL® D- 60, D-80, D-110, and D-130; isoparaffins available as ISOPAR® L, M and V; normal paraffins available as NORPAR® 12, 13 and 15; and branched alcohols such as hexyl, isoheptyl, isooctyl, and isononyl alcohols available as EXXAL® 6, 7, 8, and 9, respectively. The effective ratio of the first nonionic surfactant material represented by formula I (a) to the second deinking nonionic surfactant material (b) to nonpolar solvent (c) preferably ranges from about 1:46.5:2.5 to about 1.5:0.5:3.0. and more preferably ranges from 1:16:3 to 1:1.2:1.8, the total amount of the components being equal to 100 percent of the deinking agent.

The deinking process of the present invention comprises the steps of pulping the electrostatically printed wastepaper or a mixture of electrostatically printed and non-electrostatically printed wastepaper, such as conventional impact ink printed wastepaper, into a slurry of paper fibers in an aqueous medium having an alkaline pH of preferably from about 7.5 to 11.5, and more preferably from about 9.5 to 11; optionally adding to the pulping apparatus or to the resulting slurry of paper fibers, with agitation, a suitable collector in an amount preferably of from about 0.01 to about 5.0 weight percent of the dry pulp fiber, and more preferably, from about 0.02 to 3.0 weight percent; adding to the slurry of paper fibers, with agitation, a deinking amount, i.e., preferably from about 0.1 to about 5.0 weight percent of the dry pulp fiber, and more preferably, from about 0.2 to 3.0 weight percent, of the deinking agent of the present invention; continuing the agitation, preferably for between about 5 and 60 minutes, more preferably, for between about 15 to 60 minutes, and most preferably, for between about 30 to 60 minutes, while preferably maintaining a temperature of about 120° F. (48.9° C.) to about 175° F. (79.4° C.), and more preferably a temperature of about 140° F. (60° C.) to about 175° F. (79.4° C.); and separating the agglomerated electrostatic ink particles or the combination of the electrostatic and nonelectrostatic ink particles from the aqueous paper fiber slurry.

Pulping of the wastepaper may be effected using any conventional process and apparatus. Typically, wastepaper is treated in a so called hydropulper which produces an aqueous slurry of fibers. Such pulp slurries typically contain from about 3 to about 20 weight percent and usually from about 4 to about 12 weight percent of paper based on the weight of the dry fiber relative to the total weight of the slurry. The pH of the fiber slurry in the hydropulper is typically adjusted to an alkaline pH of from about 7.5 to about 11.5 with a suitable alkaline reagent, such as sodium hydroxide.

A suitable collector may be added to the hydropulper or to the resulting pulp slurry under agitation. Suitable collectors may be defined as having solubility properties similar to the toners used in the electrostatically printed paper so that the toners are slightly soluble in the collector. Suitable collectors may also be described in terms of their glass transition temperature. See U.S. Pat. No. 4,820,379 column 3 lines 37 to 45. Suitable collectors may be polymeric materials having a glass transition temperature in the range of from about 20° C. to about 95° C. Collectors may be selected from the group consisting of polyvinyl chloride, polyurethane, polypropylene, polyacrylate, polystyrene, polyester, and styrene-acrylate copolymer. Preferably, the collector is a polystyrene. Contact of the pulp with the collector and deinking agent is necessary for a time sufficient to agglomerate the toner or ink particles into discrete masses or globules. Depending on the ink loading on the wastepaper, contact time may vary from as little as five minute to one hour. Collecting chemicals that enhance the overall agglomeration process, such as the substituted polyethylene oxide materials specified in U.S. Pat. No. 4,820,379, or the collecting chemicals identified in U.S. Pat. No. 4,276,118, the disclosures of which are herein incorporated by reference, may also be added with the collector individually or as components of the deinking agent.

After the wastepaper has been substantially reduced to individual paper fibers, i.e., pulp, the deinking agent of the present invention is added to the alkaline aqueous pulp slurry with agitation. Agitation is continued for about 5 to about 60 minutes while maintaining a temperature of from about 120° F. (48.9° C.) to 175° F. (79.4° C.). This time period for agitation is necessary for the formation of agglomerates of electrostatic ink or toner particles, with or without the addition of a suitable collector and collecting chemical, and the dispersion of nonelectrostatic inks into the aqueous medium.

Separation of electrostatic ink or toner agglomerates is typically accomplished by taking advantage of two physical properties of the agglomerates, namely density and size. Processes such as centrifugation and screening are most effective in removing the agglomerates of electrostatic toner or ink. Flotation ink separation processes that generally involve passing a stream of air bubbles through an aqueous slurry of fibers may also be effective if the size of the agglomerate is less than about 250 microns.

When the wastepaper is a mixture of electrostatically printed and non-electrostatically printed wastepaper, such as conventional impact ink printed wastepaper, conventional methods of flotation or washing, as described in U.S. Pat. No. 4,518,459, the disclosure of which is incorporated herein by reference, may be used in addition to the centrifugation or screening ink separation processes.

In one embodiment of the present invention, a deinking agent comprising a synergistic combination of the nonionic surfactant material of formula I and an ethoxylated alcohol such as TERGITOL® 15-S-3 is added to an aqueous slurry of paper fibers prepared from electrostatically printed paper in a hydropulper and the slurry is maintained in the hydropulper with agitation at a pH of about 9.5 and a temperature of about 140° F. (60° C.). The treated slurry is mixed for 30 minutes. Afterwards, the agglomerated ink particles are removed by centrifugation and the resulting pulp is of a high quality suitable for use in making writing grade paper.

In another embodiment of the present invention, a polymeric collector of the type described in U.S. Pat. No. 4,820,379 and a deinking agent comprising a combination of the nonionic surfactant material of formula I, a material of formula III, available as ANTAROX LF 330, and a nonpolar solvent are added to an aqueous slurry of paper fibers prepared from 70 weight percent electrostatically printed paper and 30 weight percent conventional impact ink printed paper, maintained in the hydropulper with agitation at a pH of about 10 and a temperature of about 150° F. (65.6° C.). The treated slurry is mixed for about 30 minutes. Afterwards, the agglomerated and dispersed ink particles are removed by flotation and centrifugation and the resulting pulp is of a high quality suitable for use in making writing grade paper.

It is of course to be understood that the method of this invention may be practiced batchwise or continuously. Also, the aqueous pulp slurry may contain other additives commonly used in deinking operations, e.g., other surfactants, bleaches, brighteners, softeners, defoamers, dispersants, chelating agents and the like.

The present invention is more particularly described in the following example which is intended as illustrative only, since numerous modifications and variations therein will be apparent to those skilled in the art.

EXAMPLE

The paper used was 8½ by 11 inch (21.59 by 27.95 centimeters) sheets printed on one side with a specific electrostatic ink or toner in a uniform test pattern using a laser printer or copier. Each printed sheet contained approximately 3.3 weight percent of ink or toner. The various inks and toners used were as follows: (a) SAVIN® 5020 Toner, (b) CANON® NP-6000/7000/8000 Series Toner, (c) HEWLETT-PACKARD® 92295A Toner, (d) XEROX® 5090 Dry Ink, (e) KODAK EKTAPRINT® K Toner, (f) KODAK EKTAPRINT® L Toner, (g) KODAK COLOREDGE® Toner Magenta, (h) KODAK COLOREDGE® Toner Cyan.

The furnish used for pulping consisted of 302 grams of printed paper. This mixture of electrostatically printed paper was composed of 60 grams each of paper printed with electrostatic inks (a), (b), (c) and (d); 27 grams each of paper printed with (e) and (f); and 4 grams each of paper printed with (g) and (h).

A one-gallon Maelstrom laboratory pulper made by the Adriondack Machine Company was used to pulp the furnish according to the following procedures: 4,100 grams of tap water and 30 grams of a 10 weight percent sodium hydroxide solution were added to the laboratory pulper and heated to 60° C.; 302 grams of the above described furnish was added to the pulp; and pulping was conducted until the paper was completely defibered, which took about 15 minutes. The resulting pulp had a consistency of 6.8 percent.

After pulping, the pulp was divided into 400 gram batches in separate beakers fitted with temperature probes. The pulp in the beakers was stirred at 600 rpms and heated to 70° C. Specific test chemicals were added at a concentration of about 1 percent of the dry weight of the test pulp to each of the beakers except to one beaker which was designated an untreated control. After the addition of test chemicals, the pulp in each of the beakers (including the untreated control) was stirred for 30 minutes while maintaining the pulp temperature at 70° C. Afterwards, the resulting pulp slurry was made into three handsheets in accordance with TAPPI Method T-205 om-88. The handsheets prepared from each pulp sample were evaluated for dirt count using the camera-based Quantimet 520 by Leica, Inc., a computerized image analysis system. Prior to testing, the image analyzer was calibrated to the TAPPI Dirt Estimation Chart in TAPPI Methods T-213 and T-417. An area of 4 by 4 inches (100 by 100 millimeters) on both sides of the three handsheets was scanned to generate the Fine Dirt Count, i.e., the number of particles having a surface area less than 0.04 millimeter square. The Fine Dirt Count was used to monitor the effectiveness of the agglomeration process. The specific test chemicals used to treat the pulp are listed in Table 1. The test chemicals, and mixtures of test chemicals are reported as weight percentages. Results of the deinking studies are reported as Fine Dirt Count and are listed in Table 2.

TABLE 1

DEINKING CHEMICALS TESTED

1. Untreated Control

Isopar® L ($C_{11}$–$C_{13}$ isoparaffinic hydrocarbons)

Tergitol® 15-S-3 ($C_{11}$–$C_{15}$ secondary alcohol ethoxylate)

Octyl phenol alkoxylated with 3 moles of ethylene oxide and chloro capped

Icanol® TDA-3 (ethoxylated tridecyl alcohol)

Antarox® LF-330 (chloro-capped linear aliphatic polyether)

Betz® CDI B279

TABLE 2

| RESULTS OF DEINKING STUDIES ON ELECTROSTATICALLY PRINTED WASTEPAPER | |
|---|---|
| TREATMENT CHEMICAL | FINE DIRT COUNT |
| 1 | 6026 |
| 2 | 1201 |
| 3 | 244 |
| 4 | 1393 |

TABLE 2-continued

RESULTS OF DEINKING STUDIES ON
ELECTROSTATICALLY PRINTED WASTEPAPER

| TREATMENT CHEMICAL | FINE DIRT COUNT |
|---|---|
| 5 | 1375 |
| 6 | 273 |
| 7 | 234 |
| 90% (3), 10% (4) | 99 |
| 80% (3), 20% (4) | 57 |
| 60% (3), 40% (4) | 85 |
| 65% (3), 30% (2), 5% (4) | 40 |
| 40% (3), 50% (2), 10% (4) | 44 |
| 60% (3), 30% (2), 10% (4) | 41 |
| 70% (3), 20% (2), 10% (4) | 34 |
| 80% (3), 10% (2), 10% (4) | 42 |
| 90% (5), 10% (4) | 885 |
| 80% (5), 20% (4) | 859 |
| 60% (5), 30% (2), 10% (4) | 472 |
| 50% (5), 30% (2), 20% (4) | 131 |
| 40% (5), 30% (2), 30% (4) | 65 |
| 90% (6), 10% (4) | 132 |
| 80% (6), 20% (4) | 68 |

The results in Table 2 indicate that the combinations of treatment chemicals 2 thru 6 produced lower fine dirt counts than the individually tested treatment chemicals. All of the combinations tested except [90%(5) and 10%(4)], [80%(5) and 20%(4)] and [60%(5), 30%(2) and 20%(4)] produced lower fine dirt counts than Treatment Chemical 7 which is BETZ® CDI B279. The performance of the components in the excepted combinations did demonstrate an improvement over that of Treatment Chemical 7 after formulation with ISOPAR® L, Treatment chemical 2, and increasing the percentage of Treatment Chemical 4.

The present invention has been described with reference to specific details of certain embodiments thereof, it is not intended that such details should be regarded as limitations upon the scope of the invention except insofar as they are included in the accompanying claims.

What is claimed is:

1. A method for deinking printed paper selected from the group consisting of electrostatically printed paper and a mixture of electrostatically printed paper and impact ink printed paper comprising the steps of:
   (a) pulping such printed paper in an alkaline aqueous medium, thereby to produce an aqueous slurry of paper fibers and particles of electrostatic ink,
   (b) adding to said slurry with agitation a deinking amount of deinking agent comprising, in combination,
      (i) a first nonionic surfactant material represented by the formula:

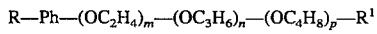

$$R-Ph-(OC_2H_4)_m-(OC_3H_6)_n-(OC_4H_8)_p-R^1$$

wherein R is an aliphatic hydrocarbon group containing from about 8 to 10 carbon atoms, Ph is the bivalent phenylene group, $R^1$ is selected from the group consisting of chloro and phenoxy, m, n, and p are each a number of between 0 and about 10, provided that the sum of m, n, and p is a number between about 1 and 10; and
      (ii) a second deinking nonionic surfactant material selected from the group consisting of:
         a) a nonionic surfactant represented by the formula, $R^2-(OC_2H_4)_r-OH$, wherein $R^2$ is an aliphatic hydrocarbon group containing from about 10 to about 16 carbon atoms and r is a number of between about 1 and about 5;
         b) a nonionic surfactant represented by the formula, $R^3-(OC_2H_4)_s-R^4$, wherein $R^3$ is an aliphatic hydrocarbon group containing from about 8 to about 14 carbon atoms, $R^4$ chloro and s is a number of between about 0.5 and about 15; and
         c) mixtures of said second nonionic surfactants wherein the ratio of said first nonionic surfactant material (i) to the second nonionic surfactant material (ii) being from about 1:100 to about 1:1,
   (c) agitating the slurry of step (b) to agglomerate the particles of electrostatic ink, and
   (d) separating the agglomerated electrostatic ink particles form the aqueous slurry of paper fibers.

2. The method of claim 1 wherein R is an aliphatic hydrocarbon group of about 8 carbon atoms, $R^1$ is chloro, m is about 3, $R^2$ is an aliphatic hydrocarbon group containing from about 11 to about 15 carbon atoms, and r is about 3.

3. The method of claim 2 wherein a non-polar solvent (iii) having a flash point higher than 125° F. is included with the deinking agent and the ratio of said first nonionic surfactant material (i) to the second deinking surfactant material (ii) to the non-polar solvent (iii) ranges from about 1:46.5: 2.5 to about 1.5:0.5:3.

4. The method of claim 3 wherein from about 0.2 to 3.0 weight percent deinking agent, based on the weight of the dry pulp fiber, is used.

5. The method of claim 4 wherein the pH of the pulped slurry is from about 7.5 to about 11.5; the temperature at which deinking is performed is from about 120° F. to about 175° F.; and the agitation in step (c) is continued for between about 5 and about 60 minutes.

6. The method of claim 1 wherein a non-polar solvent (iii) having a flash point higher than 125° F. is included with the deinking agent and the ratio of said first nonionic surfactant material (i) to the second surfactant material (ii) to the non-polar solvent (iii) ranges from about 1:46.5:2.5 to about 1.5:0.5:3.

7. The method of claim 6 wherein from about 0.2 to 3.0 weight percent deinking agent, based on the weight of the dry pulp fiber, is used.

8. The method of claim 7 wherein the pH of the pulped slurry is from about 7.5 to about 11.5; the temperature at which deinking is performed is from about 120° F. to about 175° F.; and the agitation in step (c) is continued for between about 5 and about 60 minutes.

9. The method of claim 6 wherein a chemical collector having solubility properties similar to the electrostatic ink is added to step (a) in an amount of from about 0.01 to about 5.0 weight percent based on the weight of the dry pulp fiber, said collector being a polymeric material having a glass transition temperature in the range of from about 20° C. to about 95° C.

10. The method of claim 9 wherein the collector is selected from the group consisting of polyvinyl chloride, polyurethane, polypropylene, polyacrylate, polystyrene, polyester and styrene-acrylate copolymer.

11. The method of claim 1 wherein from about 0.2 to 3.0 weight percent deinking agent, based on the weight of the dry pulp fiber, is used.

12. The method of claim 11 wherein the pH of the pulped slurry is from about 7.5 to about 11.5; the temperature at which deinking is performed is from about 120° F. to about 175° F.; and the agitation in step (c) is continued for between about 5 and about 60 minutes.

13. The method of claim 1 wherein a chemical collector having solubility properties similar to the electrostatic ink is added to step (a) in an amount of from about 0.01 to about 5.0 weight percent based on the weight of the dry pulp fiber, said collector being a polymeric material having a glass transition temperature in the range of from about 20° C. to about 95° C.

14. The method of claim 13 wherein the collector is selected from the group consisting of polyvinyl chloride, polyurethane, polypropylene, polyacrylate, polystyrene, polyester and styrene-acrylate copolymer.

* * * * *